United States Patent
Ryu et al.

(10) Patent No.: US 9,721,734 B2
(45) Date of Patent: Aug. 1, 2017

(54) GRAPHENE-NANOMATERIAL COMPOSITE, ELECTRODE AND ELECTRIC DEVICE INCLUDING THE SAME, AND METHOD OF MANUFACTURING THE GRAPHENE-NANOMATERIAL COMPOSITE

(71) Applicant: Samsung Electronics Co., Ltd., Suwon-si, Gyeonggi-Do (KR)

(72) Inventors: Chong-joon Ryu, Seoul (KR); Nae-young Jung, Chungcheongnam-do (KR); Soon-geun Kwon, Chungcheongnam-do (KR); Jae-young Choi, Suwon-si (KR)

(73) Assignees: Samsung Electronics Co., Ltd., Gyeonggi-do (KR); Corning Precision Materials Co., Ltd., Chungcheongnam-do (KR)

( * ) Notice: Subject to any disclaimer, the term of this patent is extended or adjusted under 35 U.S.C. 154(b) by 191 days.

(21) Appl. No.: 14/186,052

(22) Filed: Feb. 21, 2014

(65) Prior Publication Data
US 2014/0242496 A1  Aug. 28, 2014

(51) Int. Cl.
*H01G 11/36* (2013.01)
*C01B 31/04* (2006.01)
(Continued)

(52) U.S. Cl.
CPC .............. *H01G 11/36* (2013.01); *B32B 9/04* (2013.01); *B82Y 30/00* (2013.01); *B82Y 40/00* (2013.01); *C01B 31/0484* (2013.01); *H01G 11/32* (2013.01); *H01M 4/366* (2013.01); *H01M 4/583* (2013.01); *H01M 4/96* (2013.01);
(Continued)

(58) Field of Classification Search
None
See application file for complete search history.

(56) References Cited

U.S. PATENT DOCUMENTS

| 7,623,340 B1 | 11/2009 | Song et al. |
| 7,875,219 B2 | 1/2011 | Zhamu et al. |

(Continued)

FOREIGN PATENT DOCUMENTS

| CN | 102412065 A | 4/2012 |
| EP | 2327661 A1 | 6/2011 |

(Continued)

OTHER PUBLICATIONS

Du, Feng et al. "Preparation of Tunable 3D Pillared Carbon Nanotube—Graphene Networks for High-Performance Capacitance." *Chemistry of Materials*, vol. 23, No. 21 (2011): 4810-4816.

(Continued)

*Primary Examiner* — Patrick Ryan
*Assistant Examiner* — Wyatt McConnell
(74) *Attorney, Agent, or Firm* — Harness, Dickey & Pierce P.L.C.

(57) ABSTRACT

A graphene-nanomaterial composite, an electrode and an electric device including the graphene-nanomaterial composite and a method of manufacturing the graphene-nanomaterial composite include a graphene stacked structure including a plurality of graphene films stacked on one another; and a nanomaterial between the plurality of graphene films and bonded to at least one of the plurality of graphene films by a chemical bond.

22 Claims, 3 Drawing Sheets

(51) Int. Cl.
  *B82Y 30/00* (2011.01)
  *B82Y 40/00* (2011.01)
  *H01G 11/32* (2013.01)
  *B32B 9/04* (2006.01)
  *H01M 4/583* (2010.01)
  *H01M 4/96* (2006.01)
  *H01M 4/36* (2006.01)
  *H01M 4/86* (2006.01)

(52) U.S. Cl.
  CPC .......... *H01M 4/8605* (2013.01); *Y02E 60/13* (2013.01); *Y10T 428/24975* (2015.01); *Y10T 428/249967* (2015.04); *Y10T 428/25* (2015.01); *Y10T 428/30* (2015.01)

(56) References Cited

U.S. PATENT DOCUMENTS

| | | | | |
|---|---|---|---|---|
| 8,211,957 B2* | 7/2012 | Park | ............ | B82Y 30/00 428/297.4 |
| 8,227,386 B2 | 7/2012 | Xiao et al. | | |
| 2001/0055763 A1* | 12/2001 | Singh | ............ | B82Y 15/00 435/6.11 |
| 2005/0022726 A1* | 2/2005 | Wong | ............ | B82Y 30/00 117/105 |
| 2011/0045347 A1 | 2/2011 | Liu et al. | | |
| 2011/0114894 A1 | 5/2011 | Choi et al. | | |
| 2011/0157772 A1* | 6/2011 | Zhamu | ............ | B82Y 30/00 361/502 |
| 2011/0226960 A1 | 9/2011 | Zhang et al. | | |
| 2012/0088154 A1 | 4/2012 | Liu et al. | | |
| 2012/0152725 A1 | 6/2012 | Barker et al. | | |

FOREIGN PATENT DOCUMENTS

| | | |
|---|---|---|
| KR | 20120023471 A | 3/2012 |
| KR | 20120104264 A | 9/2012 |
| KR | 20130001705 A | 1/2013 |
| WO | WO-2013/100382 A1 | 7/2013 |
| WO | WO-2014/040275 A1 | 3/2014 |

OTHER PUBLICATIONS

Extended European Search Report dated Jun. 30, 2014 issued in corresponding European Application No. 14154726.5.
Korean Office Action dated Jul. 14, 2016 issued in corresponding Korean Patent Application No. 10-2013-0019375 (English translation provided).

* cited by examiner

GRAPHENE-NANOMATERIAL COMPOSITE, ELECTRODE AND ELECTRIC DEVICE INCLUDING THE SAME, AND METHOD OF MANUFACTURING THE GRAPHENE-NANOMATERIAL COMPOSITE

CROSS-REFERENCE TO RELATED APPLICATIONS

This application claims the benefit of priority under 35 U.S.C. §119 from Korean Patent Application No. 10-2013-0019375, filed on Feb. 22, 2013, in the Korean Intellectual Property Office, the disclosure of which is incorporated herein in its entirety by reference.

BACKGROUND

1. Field

The present disclosure relates to a graphene-nanomaterial composite, an electrode and an electric device including the same, and/or a method of manufacturing the graphene-nanomaterial composite.

2. Description of the Related Art

Secondary batteries and electrochemical capacitors (ECs) among electric devices are representative of energy storage devices using an electrochemical principle. The ECs use a charge phenomenon resulting from simple migration of ions across an interface between an electrode and an electrolyte, or a surface chemical reaction. When an electrolyte solution exists between metallic electrodes, electrolyte ions are adsorbed on the surface of the electrode during the application of voltage to electrically charge the EC. Therefore, the EC is receiving attention as an advanced energy storage device that may be used as an auxiliary battery or a device for replacing a battery due to the possibility of rapid charging and discharging, and characteristics of high charge and discharge efficiency and semi-permanent cycle lifetime.

A supercapacitor is one type of electrochemical capacitor, and is classified as an electric double layer capacitor (EDLC), in which electric charging and discharging occur by physical adsorption and desorption occurring on the surface of an electrode, and as a pseudo capacitor using a rapid and reversible oxidation-reduction reaction of metal oxide.

A core material controlling the capacity performance of a device among electrode materials of the supercapacitor is an electrode active material. In general, a porous carbon-based material having a high specific surface area has been used as a typical electrode material, and activated carbon having a high specific surface area of about 1,500 $m^2/g$ to about 2,000 $m^2/g$ is now commercially used. However, with respect to the carbon-based materials, because the distribution of pores may be non-uniform, low electrode density may be observed due to the high specific surface area, and a binder material, such as a polymer, may be mixed for the formation of an electrode, and thus, conductivity may be reduced.

Therefore, there is a need to develop an electrode having improved density and having a distribution of pores and an electrode structure that facilitate the diffusion of electrolyte ions.

SUMMARY

Provided is a graphene-nanomaterial composite capable of increasing an electrode capacity per volume by stacking graphene sheets.

Provided is an electrode including the graphene-nanomaterial composite.

Provided is an electric device including the graphene-nanomaterial composite.

Provided is a method of manufacturing the graphene-nanomaterial composite.

According to some example embodiments, provided is a graphene-nanomaterial composite including a graphene stacked structure including a plurality of graphene films are stacked on one another; and a nanomaterial between the plurality of graphene films and bonded to at least one of the plurality of graphene films by a chemical bond.

The chemical bond may be a covalent bond or an ionic bond.

The covalent bond may include at least one selected from an ester group, an ether group, a carbonyl group, an amide group, a carbonate anhydride group, and an acid anhydride group.

The ionic bond may include at least one selected from a carboxylic acid ion, an ammonium ion, and an acyl cation group.

An average thickness of the plurality of graphene films may be about 100 nm or less.

The plurality of graphene films may be porous.

The nanomaterial may be shaped in the form of a particle, a tube, a wire, a rod, a fiber, or an arbitrary bulk, or a combined shape thereof.

An average diameter of the nanomaterial may be in a range of about 1 nm to about 200 nm.

The nanomaterial may be at least one selected from a carbon-based nanomaterial, a metal-based nanomaterial, a metal compound-based nanomaterial, a polymer-based nanomaterial, and a combination thereof.

The carbon-based nanomaterial may include at least one selected from carbon nanotubes, carbon nanoparticles, carbon nanowires, carbon nanofibers, fullerene, graphite, activated carbon, soft carbon including carbon calcined at a low temperature, hard carbon including carbon calcined at a high temperature, pitch carbide, mesophase pitch carbide, and calcined cokes.

The metal-based nanomaterial may include at least one selected from lithium, sodium, potassium, rubidium, cesium, iridium, nickel, manganese, vanadium, titanium, chromium, silver, molybdenum, tungsten, gold, iron, lead, tin, copper, strontium, zirconium, magnesium, barium, an alloy thereof and a mixture thereof.

The metal compound-based nanomaterial may include at least one selected from a metal oxide, a metal nitride, a metal sulfide, a metal carbide, and a metal halide.

The polymer-based nanomaterial may include at least one selected from polystyrene, polyimide, polyamide, polyvinyl pyrrolidone, polyvinyl, polyvinyl alcohol, polyethyleneoxide, polyurethane, polymethyl mathacrylate, and polypropylene.

A content of the nanomaterial may be in a range of about 1 wt % to about 50 wt % based on a total weight of the nanomaterial and one of the plurality of graphene films.

A thickness of the graphene-nanomaterial composite may be in a range of about 10 nm to about 1000 μm.

A density of the graphene-nanomaterial composite may be in a range of about 0.1 g/cc to about 10.0 g/cc.

According to further example embodiments, provided is an electrode including a current collector; and the graphene-nanomaterial composite, on the current collector.

According to yet other example embodiments, provided is an electric device including the electrode. The electric device may be one selected from a supercapacitor, a secondary battery, a fuel cell, and a solar cell.

According to still other example embodiments, a graphene-nanomaterial composite includes a first graphene layer over a second graphene layer, and a nanomaterial between the first and second graphene layers, wherein the nanomaterial is attached to at least one of the first and second graphene layers via a chemical moiety.

The nanomaterial may be attached to a surface of the at least one of the first and second graphene layers via the chemical moiety.

The nanomaterial may be attached to a surface of the first graphene layer via a first chemical moiety and a surface of the second graphene layer via a second chemical moiety.

The chemical moiety may be a part of a functional group, or a whole functional group.

The first and second graphene layers may each have electrolyte-permeable pores.

BRIEF DESCRIPTION OF THE DRAWINGS

Example embodiments will be more clearly understood from the following detailed description taken in conjunction with the accompanying drawings.

FIG. 1 illustrates a graphene-nanomaterial composite according to some example embodiments;

FIG. 2 is a schematic view of a supercapacitor according to other example embodiments;

FIG. 3 illustrates a fourier transform infrared (FTIR) spectrum of a graphene-carbon nanotube (CNT) composite prepared in Example 1;

FIG. 4 is an SEM image of the graphene-CNT composite prepared in Example 1; and

FIG. 5 is an SEM image of a graphene-CNT stacked structure prepared in Comparative Example 1.

DETAILED DESCRIPTION

Figure 1:
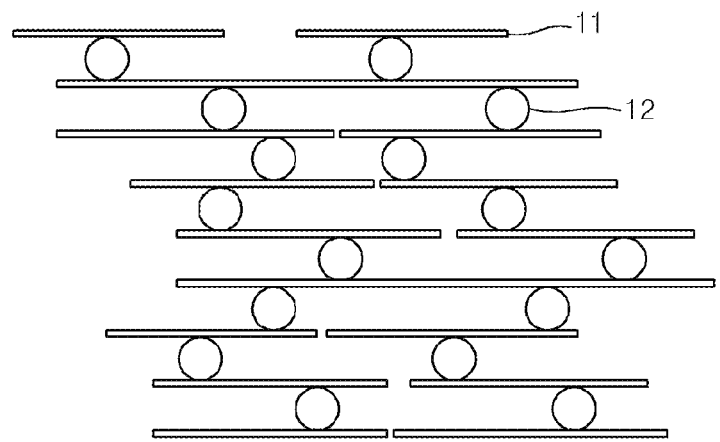
FIGS. 1-5 represent non-limiting, example embodiments as described herein.

Various example embodiments will now be described more fully with reference to the accompanying drawings in which some example embodiments are shown. However, specific structural and functional details disclosed herein are merely representative for purposes of describing example embodiments. Thus, the invention may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various features will be described in detail with reference to the attached drawings. However, example embodiments described are not limited thereto.

As used herein, the terminology "graphene film" refers to graphene, in which multiple carbon atoms are covalently bonded to one another, thereby forming polycyclic aromatic molecules, wherein the graphene forms a monolayer with a sheet-like structure forming a large surface; a network structure, in which several graphene pieces in a flake form are linked to one another, thereby forming a planar structure; or a combination thereof. The covalently bonded carbon atoms form a 6 circular ring as a basic repeat unit, but may further include 5 and/or 7 circular rings. The graphene film may have multiple layers of the sheet-like structure and/or the network structure stacked on one another, and an average thickness of the graphene film may be about 100 nm of less, for example, about 10 nm or less.

Also, as used herein, the terminology "precursor of a graphene film" refers to a graphene precursor that may be converted to a graphene film through processes including drying, heat treatment, chemical treatment, and/or additional exfoliation. Examples of the graphene precursor may be reduced graphene, a graphene oxide, chemically treated graphene such as an acid-graphite composite in which an acid is inserted between graphite layers, expanded graphite or graphite worm of which layers of expanded graphite are separated, but not completely separated, from one another by ultrasonic treatment, and a graphitic coating by a carbonization of a polymer, but are not limited thereto.

The graphene precursor may have a layered structure including a graphitic portion of which carbon having crystalline characteristics and a portion having amorphous characteristics are mixed to a certain degree, wherein the graphitic portion of the graphene precursor may occupy about 50 wt % or more in the graphene precursor.

A graphene-nanomaterial composite according to some example embodiments includes a graphene stacked structure in which a plurality of graphene films are stacked on one another; and a nanomaterial that is disposed between the stacked graphene films and binds with the graphene films by a chemical bond.

The graphene film may be porous. When a plurality of the porous graphene films are stacked to form the graphene stacked structure, holes through which electrolyte ions may pass between the graphene film are provided, and thus diffusion of the electrolyte ions into the graphene stacked structure may be promoted.

The arrangement of the pores may vary. As one example, some or all of the pores of one graphene film may partially overlap with some or all of the pores of an adjacent graphene film. In another example, pores of one graphene film may not overlap with pores of an adjacent graphene film.

The size of the pores may vary according to the electrolyte ions. As one example, the pores may vary in size such that some pores are permeable by one type of electrolyte ions but not permeable by a different type of electrolyte ions.

The arrangement and/or size of the pores may vary depending on the application. As one example, the arrangement and/or size of the pores may allow the diffusion of some electrolyte ions faster than the diffusion of other electrolyte ions.

A plurality of the graphene films are stacked to form graphene stacked structure, and the nanomaterial binding with the graphene film by chemical bonds is disposed between the stacked graphene films.

The plurality of graphene films may be arranged substantially perpendicular to one another, substantially parallel to one another, or at an angle there between.

The nanomaterial may have a particle shape; a thin and long shape such as a tube, a wire, a rod, and a fiber; or an arbitrary bulk shape, and may have a combined shape of two or more thereof.

Various compounds may be used as the nanomaterial. The nanomaterial is not particularly limited, but the nanomaterial may be electrochemically stable and may have electrical conductivity. The nanomaterial may be a carbon-based nanomaterial, a metal-based nanomaterial, a metal compound-based nanomaterial, a polymer-based nanomaterial, or a combination thereof. The carbon-based nanomaterial may be, for example, at least one selected from the group consisting of carbon nanotubes, carbon nanoparticles, carbon nanowires, carbon nanofibers, fullerene, graphite, activated carbon, soft carbon (which is carbon calcined at a relatively low temperature), hard carbon (which is carbon calcined at a relatively high temperature), pitch carbide, mesophase pitch carbide, and calcined cokes. The metal-based nanomaterial may be, for example, lithium, sodium, potassium, rubidium, cesium, iridium, nickel, manganese, vanadium, titanium, chromium, silver, molybdenum, tungsten, gold, iron, lead, tin, copper, strontium, zirconium, magnesium, barium, or an alloy thereof or a mixture thereof, and the metal compound-based nanomaterial may be an oxide, a nitride, a sulfide, a carbide, or a halide of the above metals, or may be a combination thereof. The polymer-based nanomaterial may include, for example, at least one selected from polystyrene, polyimide, polyamide, polyvinyl pyrrolidone, polyvinyl, polyvinyl alcohol, polyethyleneoxide, polyurethane, polymethyl mathacrylate, and polypropylene.

One of the examples listed for the nanomaterial may be used alone, or two or more of the examples may be used.

The nanomaterial separates the graphene films by a certain distance to prevent re-stacking of the graphene films and secures a space for the electrolyte ions to move between the graphene films.

In this regard, an average diameter (or an average size) of the nanomaterial may be in a range of about 1 nm to about 200 nm in order to secure an appropriate space that facilitates diffusion of the electrolyte ions between contact surfaces of the graphene films and manufacture a graphene-nanomaterial composite with a high electrode density and a high specific surface area. In particular, an average diameter (or an average size) of the nanomaterial may be in a range of about 2 nm to about 100 nm, more particularly, about 3 nm to about 50 nm.

The nanomaterial is bound to the graphene film by a chemical bond, and according to some example embodiments, the graphene film and the nanomaterial may be chemically bound to each other by a covalent bond or an ionic bond.

Depending on a functional group that is introduced to the nanomaterial and/or the graphene film in a pretreatment process, the covalent bond may include, for example, at least one of an ester group, an ether group, a carbonyl group, an amide group, a carbonate anhydride group, and an acid anhydride group.

The ionic bond may be an ionic bond including, for example, a carboxylic acid ion, an ammonium ion, or an acyl cationic group. Here, the ammonium ion is referred to $RNH_3^+$ (where R includes one selected from hydrogen, a C1-C20 alkyl group, an alkenyl group, and an alkynyl group).

One end of the nanomaterial (or, a first surface of the graphene film) may have a first-type of functional group, and another end of the nanomaterial (or, a second surface of the graphene film) may have a second-type of functional group where the second-type of functional group is different than the first-type of functional group.

A chemical moiety that is part of a functional group, or the whole functional group itself, may be introduced to the nanomaterial and/or the graphene film. For example, the chemical moiety may be an ester functional group (COOR), or an alkoxy moiety (—OR') of the ester functional group, an acyl moiety (RCO—) of the ester functional group, a carboxylate moiety (RCOO—) of the ester functional group, or an alkyl moiety (—R') of the ester functional group.

In order to form the chemical bond, a method as follows may be used.

For example, in order to introduce a functional group that induces a chemical bond, a pretreatment process introducing a functional group, such as a carboxylic group (—COOH), a hydroxyl group (—OH), an ether group (—O—), an epoxy group (COC), a carbonyl group (—CO—), an amine group (—$NH_2$), or an acylchloride group (COCl), to a surface of the graphene film (or the precursor thereof) and/or the nanomaterial may be performed through a wet process using a strong acid, ultrasound (or ultrasonic treatment), or heat in a liquid phase or a dry process using plasma or vacuum UV irradiation. The functional group that induces a chemical bond may be introduced to each of the graphene film and the nanomaterial. Otherwise, the functional group may be introduced to one of the graphene film and the nanomaterial, and then, a separate process of inducing a chemical bond may be later performed during a mixing process or a contacting process.

The graphene film and/or the nanomaterial to which the functional group is introduced may be mixed or contacted to each other and chemically reacted, and thus a chemical bond is induced. Depending on a type of the nanomaterial, the chemical bond with the nanomaterial may be formed after modifying a surface of the graphene film, to which the functional group is introduced by an acid treatment or the like to easily induce a chemical bond, through an additional process.

In order to secure a constant space between the stacked structures of the graphene film, the chemical bond may be formed by uniformly dispersing the nanomaterial on the surface of the graphene film without agglomeration. A method, such as a liquid immersion method, a two-zone vapor transport method, an electrochemical method, and a co-intercalation method, may be used in contacting the graphene film and/or the nanomaterial to which the functional group is introduced to induce a chemical bond.

The liquid immersion method may include dispersing a nanomaterial by mixing a nanomaterial and a graphene film in an aqueous-based liquid phase. For example, a graphene film or a precursor thereof is immersed in a liquid medium in which a nanomaterial or a precursor thereof is dissolved or dispersed in a solvent, and the graphene film or the precursor thereof may be stacked by using a centrifuging method or a vacuum filtration method. After the solvent is removed, a graphene stacked structure including the nanomaterial inserted between the graphene films, which are stacked through a selective stacking process including drying, heat treatment, reduction, and/or additional exfoliation, may be obtained. When an oxide of a graphene film precursor or a nanoparticle is used, the stacking process may be performed after a reduction process, such as a liquid hydrothermal reduction or a microwave hydrothermal reduction.

Any solvent may be used as the solvent used in the liquid immersion method so long as it may wet graphite or graphene. Examples of the solvent may be alcohols such as ethanol and methanol, acetone, dodecane, tetrahydrofuran (THF), or distilled water. A mixed solvent of two or more thereof may be used, but the solvent is not limited thereto.

In the two-zone vapor transport method, a graphene film and a nanomaterial are respectively disposed in a first chamber and a second chamber connected through a channel, and the first chamber and the second chamber are independently heated to set (or, predetermined) temperatures to convert the nanomaterial into a gas phase. Then, the nanomaterial in the gas phase is dispersed on the graphene film by a diffusion process. In the above process, content and an arrangement method of the nanomaterial may be changed according to parameters such as a type of the nanomaterial, and temperature and vapor pressure in the chamber. With respect to the nanomaterial, an intercalation process is accelerated as a size of molecules is reduced, and thus, a well-aligned intercalation layer of an intercalation compound may be obtained. Also, an intercalated amount of the intercalation compound may be increased as the vapor pressure increases.

The electrochemical method is a method of dispersing a nanomaterial on a graphene film through electrolysis by using the graphene film as an electrode and the nanomaterial as a counter electrode in an electrolyte.

The co-intercalation method denotes that two or more nanomaterials are simultaneously intercalated into a graphene film or a precursor thereof. The co-intercalation method is useful when various metals, metal compounds, or composites are intercalated as precursors of nanomaterials. The co-intercalation method is differentiated only by the fact that two or more chemically different materials are targeted as the nanomaterials, and the foregoing vapor transport method or liquid immersion method may be used as a particular process.

In the case of dispersing two or more nanomaterials, the above dispersion methods, such as a vapor transport method or a liquid immersion method, may be sequentially used as in the co-intercalation method. When the nanomaterial is sequentially dispersed, a kind of the nanomaterial being dispersed may be expanded.

In addition to the above methods, various methods known in the art, such as chemical vapor deposition (CVD), physical vapor deposition (PVD), plasma-enhanced CVD (PECVD), sputtering, arc deposition, plasma arc deposition, and spray hydrolysis, may be used.

In the graphene-nanomaterial composite, a ratio of the nanomaterial in the electrode structure is not particularly limited and may be appropriately determined in consideration of type and shape of the nanomaterial and a distribution area on the graphene film. For example, a content of the nanomaterial used may be in a range of about 1 wt % to about 50 wt %, particularly, about 2 wt % to about 45 wt %, more particularly, about 3 wt % to about 30 wt %, based on a total weight of the nanomaterial and the graphene film.

A thickness and an area of the graphene-nanomaterial composite are not particularly limited. A size of the graphene-nanomaterial composite may be adjusted so as to be suitable for a configuration of an electrode of an electric device, for example, an electrochemical capacitor or a secondary battery, to which the graphene-nanomaterial composite is applied. For example, the thickness of the graphene-nanomaterial composite may be in a range of about 10 nm to about 1,000 μm, particularly, about 30 nm to about 800 μm, and more particularly, about 50 nm to about 500 μm. Meanwhile, the surface area of the graphene-nanomaterial composite is not particularly limited.

In the graphene-nanomaterial composite, a space in a range of about 1 nm to about 200 nm may be secured by the nanomaterial between the graphene films. Also, the graphene-nanomaterial composite may have a high electrode density because the graphene films may be uniformly stacked on one another due to the nanomaterial that is chemically bonded between the graphene films without re-stacking of the graphene films and instead of being randomly distributed. For example, an electrode density of the graphene-nanomaterial composite may be in a range of about 0.1 to about 10.0 g/cc, particularly, about 0.5 to about 8.0 g/cc, and more particularly, about 1 to about 5 g/cc.

FIG. 1 illustrates a graphene-nanomaterial composite according to some example embodiments.

Referring to FIG. 1, a graphene-nanomaterial composite 10 has a structure in which graphene films 11 are uniformly stacked on each other. A nanomaterial 12 is inserted between the stacked graphene films 11 so that the graphene films 11 may not be adhered to each other, and thus a space for electrolyte ions to diffuse may be secured between the graphene films 11. The nanomaterial 12 forms a chemical bond with the graphene films 11 to help the graphene films 11 to maintain a stable shape.

An electrode according to example embodiments may include a current collector; and the graphene-nanomaterial composite disposed on the current collector.

A metal foil, or a metal foam formed of a metallic material, such as gold (Au), platinum (Pt), titanium (Ti), copper (Cu), nickel (Ni), or aluminum (Al), a graphite plate, a carbon foam, a polymer film coated with a metallic substance, or glass coated with a particular material, which does not participate in an electrode reaction, is electrochemically stable, and has excellent electrical conductivity, may be used as the current collector. However, the current collector is not limited thereto. In the case that a metal foil, such as an aluminum foil, a copper foil, a titanium foil, or a nickel foil, is used, a thickness thereof may be set to be in a range of about 20 μm to about 30 μm. Also, the current collector may have a fine uneven shape on a surface thereof so as to form an effective contact with the graphene-nanomaterial composite.

In the graphene-nanomaterial composite, the graphene films may be arranged so as to contact the current collector. Also, the graphene films may be aligned perpendicular to the current collector because a stable graphene stacked structure may be maintained by the nanomaterial.

A binder may not be used in the electrode when the graphene-nanomaterial composite is used as an active electrode layer, and even when used, a minimum amount of the binder may be used. With respect to a typical electrode material such as carbon powder, a binder, such as a polymer, is used in order to increase density and adhesion during the formation of the electrode, and the use of the binder may decrease electrical conductivity of the electrode material, and thus the binder may act as a cause of performance degradation of an electric device. In contrast, because the binder may not be used or may be used at a minimum amount, a decrease in the electrical conductivity due to the use of the binder may be reduced, and as a result, performance of the electric device may be improved accordingly.

An electric device according to example embodiments includes the electrode including the graphene-nanomaterial composite. Examples of the electric device may be various display devices such as a field emission display (FED), a liquid crystal display (LCD), and an organic light-emitting diode (OLED); various energy storage devices such as a secondary battery, an electrochemical capacitor, a fuel cell, and a solar cell; various nanodevices such as a field effect transistor (FET) and a memory device; and various electric devices such as other hydrogen storage bodies, an optical fiber, and a sensor.

A supercapacitor may be an example of an electrochemical capacitor including the graphene-nanomaterial composite.

Figure 2:
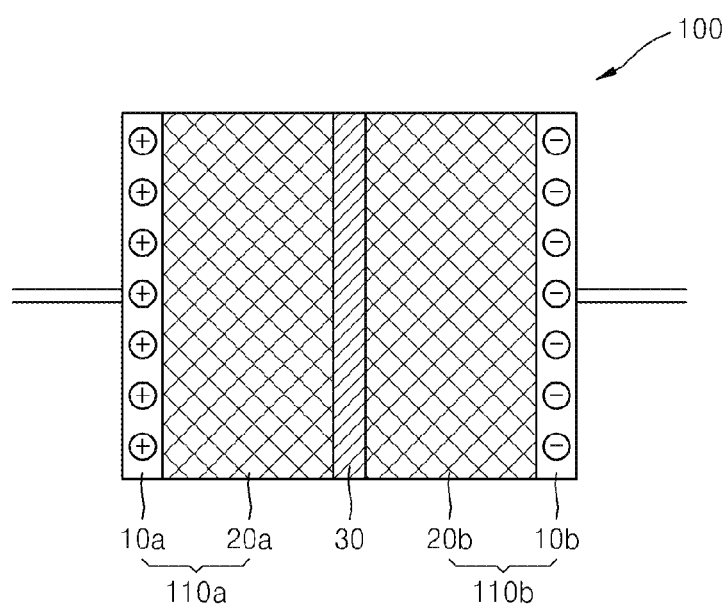

FIG. 2 schematically illustrates a supercapacitor according to other example embodiments.

Referring to FIG. 2, a supercapacitor 100 may include a first electrode 110a formed of a first current collector 10a and a first active layer 20a; a separator 30; a second electrode 110b formed of a second current collector 10b and a second active layer 20b; and an electrolyte (not shown) filled in the first and second active layers 20a and 20b. The first electrode 110a and the second electrode 110b are symmetrical about the separator 30, and structures and characteristics thereof may be the same. Therefore, the first electrode 110a will be described in detail and the description of the second electrode 110b may be substituted by the description of the first electrode 110a.

The first electrode (hereinafter, referred to as "electrode for a supercapacitor" or "electrode") 110a may include the first current collector (hereinafter, referred to as "current collector") 10a and the first active layer (hereinafter, referred to as "active layer") 20a. The current collector 10a may collect electrons from the active layer 20a or may provide electrons to the active layer 20a. As described above, a metal foil or a metal foam formed of a metallic material, such as Au, Pt, Ti, Cu, Ni, or Al, a graphite plate, a carbon foam, a polymer film coated with a metallic substance, or glass coated with a particular material, which does not participate in an electrode reaction, is electrochemically stable, and has excellent electrical conductivity, may be used as the current collector 10a. However, the current collector 10a is not limited thereto.

The active layer 20a may be prepared on the current collector 10a. The active layer 20a includes the graphene-nanomaterial composite. The graphene-nanomaterial composite may be the same as described above.

The supercapacitor 100 may include the separator 30 between the first electrode 110a and the second electrode 110b. The separator 30 blocks the migration of electrons between the first electrode 110a and the second electrode 110b, and thus, may prevent an electrical short between two electrodes. Herein, the separator 30 may be formed of propylene, polyethylene, or Teflon. However, the separator 30 is not limited thereto.

The supercapacitor according to example embodiments may include a graphene-nanomaterial composite, which may control (or, contain) pores so as to increase the diffusion of electrolyte ions, may have high density, and simultaneously, may stably maintain the graphene film having a structure perpendicular to the current collector. Thus, power and energy density may be improved.

Hereinafter, a method of manufacturing a graphene-nanomaterial composite will be described.

The method of manufacturing a graphene-nanomaterial composite may include introducing a first functional group to a graphene film or a precursor thereof; forming a graphene-nanomaterial composite unit by generating a chemical reaction between a nanomaterial and the graphene film, wherein the nanomaterial includes a second functional group that may be chemically bonded with the first functional group; and stacking the graphene-nanomaterial composite unit.

A graphene oxide film may be used as the precursor of the graphene film. A commercially available graphene oxide film may be used as the graphene oxide film, or a graphene oxide film may be directly prepared. In the case that a graphene oxide film is prepared, the graphene oxide film, for example, may be prepared as follows.

First, a layered graphite material is immersed in an acid solution to intercalate an acid between the layers of graphite and thus, an acid-graphite composite is prepared. The acid-graphite composite is expanded by a heat treatment to synthesize a graphite oxide or an expanded graphite. The graphite oxide or the expanded graphite thus synthesized is not a single sheet of a graphene oxide film, but is still in a state of graphite in which only an interlayer distance is increased. A graphene oxide film may be obtained therefrom through an additional exfoliation process. In the case that a physical force is applied, graphite oxide or expanded graphite is immersed in a solvent and ultrasonically treated to be exfoliated into a graphene oxide film, and the graphene oxide film may be collected by a centrifuge or vacuum filtration method. Also, a film may be coated with a solution having a graphene oxide film dispersed therein. Spraying, bar coating, or screen printing may be used as a coating method. Meanwhile, the solution having the graphene oxide film dispersed therein may be introduced in the same manner as it is in a subsequent dispersion process of a nanomaterial.

A hydrophilic first functional group may be introduced to a surface of the precursor of the graphene film, which is a graphite material that is treated with an acid and ultrasonically treated in liquid. The first functional group is capable of forming a chemical bond with a second functional group that is introduced or contained in the nanomaterial, and examples of the first functional group include, for example, a hydroxyl group, a carboxyl group, an amine group, and an epoxide group.

The nanomaterial includes the second functional group that may form a chemical bond by selectively reacting with the first functional group, which is introduced to the graphene film or the precursor thereof, and examples of the second functional group include, for example, a hydroxyl group, a carboxyl group, an amine group, and an epoxide group. The second functional group may be contained in the nanomaterial or may be introduced to a surface of the nanomaterial through a separate process. The introduction of the second functional group may be performed through a process similar to a step for introducing the first functional group to the graphene film or the precursor thereof.

The graphene film or the precursor thereof and the nanomaterial, each introduced with a functional group, are uniformly mixed or dispersed so that a chemical reaction therebetween may occur, thereby forming a chemical bond between the graphene film or the precursor thereof and the nanomaterial. A method for dispersing the nanomaterial on a surface of the graphene film or the precursor thereof may be a liquid immersion method, a two-zone vapor transport method, an electrochemical method, or a co-intercalation method. The dispersing may be performed by liquid-mixing by using a liquid immersion method. During the liquid-mixing, the graphene film or the precursor thereof may be sufficiently stirred to allow a chemical reaction to occur between the graphene film or the precursor thereof and the nanomaterial.

Graphene-nanomaterial composite units in which a chemical bond is formed between the graphene film or the precursor thereof and the nanomaterial through the uniform mixing or dispersing process are obtained. The graphene-nanomaterial composite units are stacked on one another in a layer shape, and thus a graphene-nanomaterial composite may be obtained. The stacking process may be performed by using, for example, a vacuum filtration method.

According to example embodiments, the method of manufacturing the graphene-nanomaterial composite may further include reducing the graphene-nanomaterial composite units before or after the stacking of the graphene-nanomaterial composite units.

For example, when a graphene oxide film is used as the precursor of the graphene film, or when the nanomaterial is oxidized, the reducing process may be further performed, and the reducing process may be done before or after the stacking process.

The reducing process may be performed by using, for example, a chemical, thermal, or thermal-chemical reducing process or a microwave hydrothermal reducing method. The chemical reducing process includes various methods such as fuming, dipping, in-situ, and the like depending on a reducing agent. Examples of the reducing agent may be hydrazine ($N_2H_4$), HI acid, ascorbic acid, $NaBH_4$, and the like. When hydrazine is used, there may be a method of reducing a graphene oxide film using hydrazine vapor or an in-situ method preparing a reduced graphene oxide (rGO) solution from a graphene oxide solution.

The thermal reducing process may reduce a graphene oxide film, for example, by performing heat-treatment at a temperature of 300° C. or higher. The thermal reducing process may be performed in a reducing atmosphere, such as Ar, $H_2$, or $N_2$, and the reduction may be performed at a pressure slightly higher than an atmospheric pressure to avoid air ingress. The graphene oxide film may be reduced at a temperature, for example, in a range of about 300° C. to about 900° C., wherein the functional group attached on the graphene may be removed at a temperature within the range.

The thermal-chemical reducing process is a method using a combination of the chemical reducing process and the thermal reducing process.

The microwave hydrothermal reducing process with or without a reducing agent at a temperature of 100° C. or higher, which is higher than the boiling point of water, may reduce the graphene oxide film at a faster rate than a general chemical reducing method.

An order of performing the stacking process and the reducing process of the oxidized graphene precursor and the nanomaterial may be reversed.

The graphene-nanomaterial composite obtained by the reduction may be black and may have conductivity.

Example embodiments will be described in further detail with reference to the following examples. However, the scope is not limited thereto.

Example 1

First, graphite oxide was prepared by using a Hummer's method. Here, graphene oxide (hereinafter, referred to as GO) was prepared by performing ultrasonic treatment in liquid on the graphite oxide at a concentration in a range of about 0.1 g/L to about 1 g/L with distilled water as a solvent to separate layers of the graphite oxide.

Single walled carbon nanotubes (hereinafter, referred to as SWCNTs) were used as a carbon-based nanomaterial, and a metal catalyst was removed through a purification process.

The SWCNTs were acidified under conditions as follows. 60 mg of the SWCNTs were dispersed in 50 mL of an $H_2SO_4$—$HNO_3$ mixture (at a mixing ratio of $H_2SO_4$:$HNO_3$=3:1) and reacted for about 48 hours by using a bath sonicator. The reacted dispersion was sufficiently washed by using DI water and dried to prepare oxidized SWCNTs. 1 mg of 2-(1H-7-Azabenzotriazol-1-yl)-1,1,3,3-tetramethyluronium hexafluorophosphate Methanaminium (HATU) was added to 10 ml of ethylenediamine, 20 mg of the oxidized SWCNTs were added thereto and sonicated for 4 hours to synthesize SWCNT-$NH_2$, in which the surface of the SWCNTs was modified with $NH_2$. The resultant was washed with methanol, and then an aqueous solution including 4 mg of SWCNT-$NH_2$ dispersed in 20 ml of water was prepared.

Subsequently, 10 mg of 1-Ethyl-3-(3-dimethylaminopropyl)carbodiimide (EDC) and 8 mg of N-hydroxysuccinimide (NHS) were added to 60 ml of water, in which 20 mg of GO was dispersed, and stirred for 30 minutes to prepare a GO-NHS solution. After the GO-NHS solution was stirred with 4 mg/20 ml of the SWCNT-$NH_2$ dispersed solution, pH of the mixture was adjusted to 7 by using $NH_3$, and then the mixture was stirred in a water bath at a temperature of 80° C. for 1 hour to form an amide bond.

For the reducing process, $NH_3$ was added to the resultant to adjust pH to 10, 10 ul of hydrazine ($N_2H_4$) was mixed thereto, and then a hydrothermal reaction was performed by using a microwave device at a temperature of 160° C. for 10 minutes. The reduced solution was stacked on nylon by using a vacuum filtration method to manufacture a graphene-CNT composite.

Figure 3:
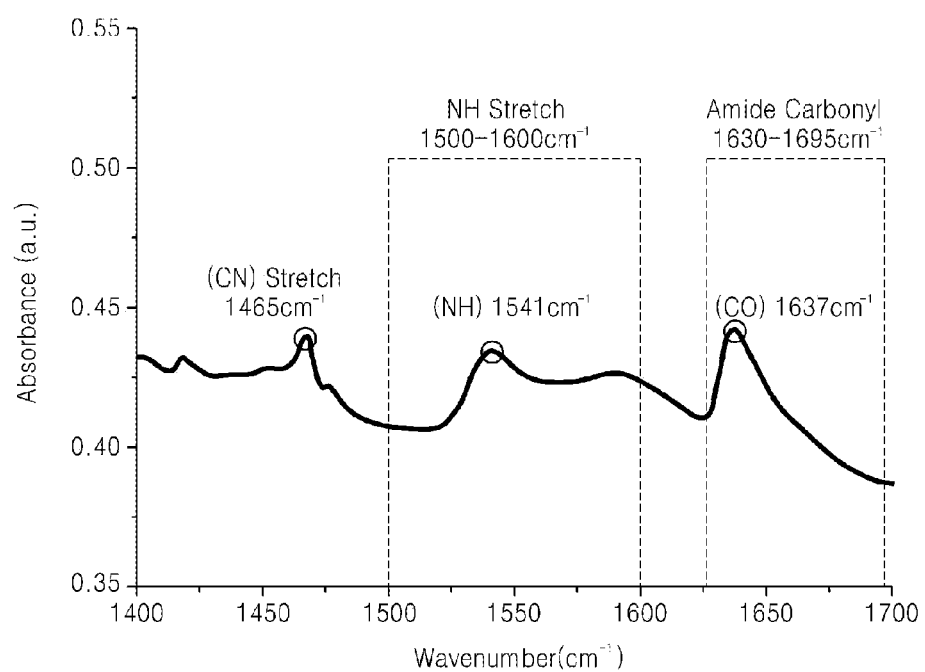

FIG. 3 illustrates a result of FTIR analysis of the graphene-CNT composite prepared in the manner described above. As shown in FIG. 3, an amide bond is formed between the graphene and the CNTs.

Comparative Example 1

A graphene-CNT stacked structure was prepared in the same manner as in Example 1 except that the GO and the SWCNT oxide prepared in Example 1 were used and dispersed in water without chemical bonding as follows.

That is, an aqueous solution including 20 mg of the GO dispersed in 60 ml of water and an aqueous solution including 4 mg of the SWCNT oxide dispersed in 20 ml of water were mixed together, dispersed by ultrasonic treatment, and the mixture went through the same mixing and stacking processes in Example 1.

Evaluation Example 1: Observation of Scanning Electron Microscope (SEM) Image

Figure 4:
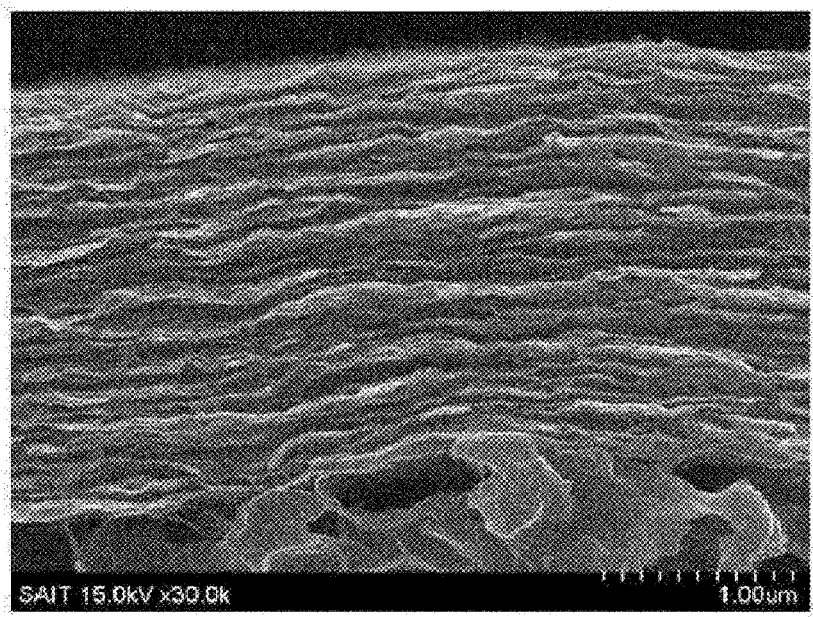
Figure 5:
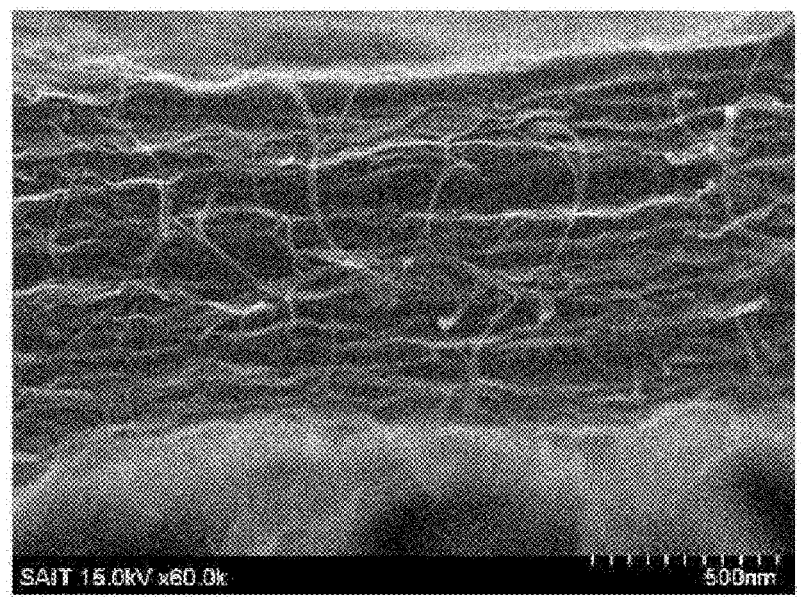

FIG. 4 is an SEM image of the graphene-CNT composite prepared in Example 1, and FIG. 5 is an SEM image of the graphene-CNT stacked structure prepared in Comparative Example 1.

As shown in FIGS. 4 and 5, the graphene-CNT composite prepared in Example 1 has all CNTs arranged in a basal plane direction due to the chemical bond between the graphene and the CNTs, while the graphene-CNT stacked structure prepared in Comparative Example 1 has CNTs that have escaped out of the stacked structure because the graphene and the CNTs are not bonded but are only physically contacting each other.

Evaluation Example 2: Capacity Measurement

In order to evaluate a capacity of the graphene-CNT composite prepared in Example 1, a coin cell was prepared as follows and a galvanostatic charge/discharge was measured. 2032 CoinCell was used as the coin cell, and for an electrode, the graphene-CNT composite prepared in Example 1 and the graphene-CNT stacked structure prepared in Comparative Example 1 were each stacked on nylon, and the nylon was cut to have a diameter of 12 mm. For an electrolyte solution, a polycarbonate organic solvent including 1 M of tetraethylammonium tetrafluoroborate (TEABF4) was used. The charging/discharging was performed from 0 V to 3 V at 1 A/g, and a cycle of the charging/discharging was repeated 3 times.

For each of the coin cells, an electrode capacity was calculated using Equation 1 below, and the results are shown in Table 1 below.

$$C=It/mdV \qquad \text{EQUATION 1}$$

where C is the electrode capacity, I is the current density, t is the discharge time, m is the electrode weight, and dV is the voltage difference.

TABLE 1

|  | Example 1 | Comparative Example 1 |
|---|---|---|
| Electrode capacity | 338 F/g | 190 F/g |

As shown in Table 1, an electrode capacity of the graphene-CNT composite including the chemical bond formed between the graphene and the CNTs as prepared in Example 1 was about 70% or greater than that of graphene-CNT stacked structure including the graphene and the CNTs that are simply stacked by physical bonding as prepared in Comparative Example 1.

As described above, according to example embodiments, a graphene-nanomaterial composite has a stacked structure including a nanomaterial inserted between graphene films by a chemical bond, and thus a constant space may be secured between the graphene films so that electrolyte ions may move therethrough. In this regard, the graphene-nanomaterial composite may prevent the graphene films from re-stacking and yet may have a high electrode density. Also, the graphene-nanomaterial composite may be used in an electrical device, for example an energy storage apparatus such as a supercapacitor, to have a high output and a high energy density.

The foregoing is illustrative of example embodiments and is not to be construed as limiting thereof. Although a few example embodiments have been described, those skilled in the art will readily appreciate that many modifications are possible in example embodiments without materially departing from the novel teachings. Accordingly, all such modifications are intended to be included within the scope of the disclosure as defined in the claims. In the claims, means-plus-function clauses are intended to cover the structures described herein as performing the recited function, and not only structural equivalents but also equivalent structures. Therefore, it is to be understood that the foregoing is illustrative of various example embodiments and is not to be construed as limited to the specific embodiments disclosed, and that modifications to the disclosed embodiments, as well as other embodiments, are intended to be included within the scope of the appended claims.

What is claimed is:

1. A graphene-nanomaterial composite, comprising:
   a graphene stacked structure including a plurality of graphene films stacked on one another in a planar form; and a nanomaterial between the plurality of graphene films and bonded to at least one of the plurality of graphene films by a chemical bond, wherein the chemical bond is a covalent bond or an ionic bond, and wherein the covalent bond includes at least one selected from an ether group, a carbonate anhydride group; and an acid anhydride group.

2. The graphene-nanomaterial composite of claim 1, wherein the ionic bond includes at least one selected from a carboxylic acid ion, an ammonium ion, and an acyl cation group.

3. The graphene-nanomaterial composite of claim 1, wherein an average thickness of the plurality of graphene films is about 100 nm or less.

4. The graphene-nanomaterial composite of claim 1, wherein the plurality of graphene films are porous.

5. The graphene-nanomaterial composite of claim 1, wherein the nanomaterial is shaped in the form of a particle, a tube, a wire, a rod, a fiber, an arbitrary bulk, or a combined shape thereof.

6. The graphene-nanomaterial composite of claim 1, wherein an average diameter of the nanomaterial is in a range of about 1 nm to about 200 nm.

7. The graphene-nanomaterial composite of claim 1, wherein the nanomaterial is at least one selected from a carbon-based nanomaterial, a metal-based nanomaterial, a metal compound-based nanomaterial, a polymer-based nanomaterial, and a combination thereof.

8. The graphene-nanomaterial composite of claim 7, wherein the carbon-based nanomaterial includes at least one selected from carbon nanotubes, carbon nanoparticles, carbon nanowires, carbon nanofibers, fullerene, graphite, activated carbon, soft carbon including carbon calcined at a low temperature, hard carbon including carbon calcined at a high temperature, pitch carbide, mesophase pitch carbide, and calcined cokes.

9. The graphene-nanomaterial composite of claim 7, wherein the metal-based nanomaterial includes at least one selected from lithium, sodium, potassium, rubidium, cesium, iridium, nickel, manganese, vanadium, titanium, chromium, silver, molybdenum, tungsten, gold, iron, lead, tin, copper, strontium, zirconium, magnesium, barium, an alloy thereof and a mixture thereof.

10. The graphene-nanomaterial composite of claim 7, wherein the metal compound-based nanomaterial includes at least one selected from a metal oxide, a metal nitride, a metal sulfide, a metal carbide, and a metal halide.

11. The graphene-nanomaterial composite of claim 7, wherein the polymer-based nanomaterial includes at least one selected from polystyrene, polyimide, polyamide, polyvinyl pyrrolidone, polyvinyl, polyvinyl alcohol, polyethyleneoxide, polyurethane, polymethyl methacrylate, and polypropylene.

12. The graphene-nanomaterial composite of claim 7, wherein a content of the nanomaterial is in a range of about 1 wt % to about 50 wt % based on a total weight of the nanomaterial and one of the plurality of graphene films.

13. The graphene-nanomaterial composite of claim 1, wherein a thickness of the graphene-nanomaterial composite is in a range of about 10 nm to about 1000 μm.

14. The graphene-nanomaterial composite of claim 1, wherein a density of the graphene-nanomaterial composite is in a range of about 0.1 g/cc to about 10.0 g/cc.

15. An electrode, comprising:
a current collector; and
the graphene-nanomaterial composite according to claim 1 on the current collector.

16. An electric device, comprising:
the electrode according to claim 15.

17. The electric device of claim 16, wherein the electric device is me selected from the group consisting of a supercapacitor, a secondary battery, a fuel cell, and a solar cell.

18. A graphene-nanomaterial composite, comprising:
a first graphene layer over a second graphene layer in a planar form; and
a nanomaterial between the first and second graphene layers,
wherein the nanomaterial is attached to at least one of the first and second graphene layers via a chemical moiety,
wherein the chemical moiety is a covalent moiety or an ionic moiety, and
wherein the covalent moiety includes at least one selected from a carbonate anhydride group; and an acid anhydride group.

19. The graphene-nanomaterial composite of claim 18, wherein the nanomaterial is attached to a surface of the at least one of the first and second graphene layers via the chemical moiety.

20. The graphene-nanomaterial composite of claim 18, wherein the nanomaterial is attached to a surface of the first graphene layer via a first chemical moiety and a surface of the second graphene layer via a second chemical moiety.

21. The graphene-nanomaterial composite of claim 18, wherein the chemical moiety is a part of a functional group.

22. The graphene-nanomaterial composite of claim 18, wherein the first and second graphene layers each have electrolyte-permeable pores.

* * * * *

UNITED STATES PATENT AND TRADEMARK OFFICE
CERTIFICATE OF CORRECTION

Page 1 of 1

PATENT NO. : 9,721,734 B2
APPLICATION NO. : 14/186052
DATED : August 1, 2017
INVENTOR(S) : Chong-joon Ryu et al.

It is certified that error appears in the above-identified patent and that said Letters Patent is hereby corrected as shown below:

On the Title Page

Insert:
--(30)   Foreign Application Priority Data
Feb. 22, 2013   (KR) ........................................ 10-2013-0019375--

Signed and Sealed this
Third Day of October, 2017

Joseph Matal
*Performing the Functions and Duties of the*
*Under Secretary of Commerce for Intellectual Property and*
*Director of the United States Patent and Trademark Office*